United States Patent
Terashita

(10) Patent No.: US 6,636,322 B1
(45) Date of Patent: Oct. 21, 2003

(54) METHOD AND DEVICE FOR MEASURING CELL GAP OF LIQUID CRYSTAL DISPLAY USING NEAR-IR RADIATION

(75) Inventor: Shinichi Terashita, Seika cho (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/565,075

(22) Filed: May 4, 2000

(30) Foreign Application Priority Data

May 7, 1999 (JP) ........................... H11-126671
Aug. 23, 1999 (JP) ........................... H11-235476

(51) Int. Cl.[7] ............................. G01C 9/02
(52) U.S. Cl. ........................... 356/492; 356/504
(58) Field of Search ..................... 356/505, 506, 356/503, 504, 485, 492, 496

(56) References Cited

U.S. PATENT DOCUMENTS 5,856,871 A * 1/1999 Cabib et al. ................. 356/504
5,943,134 A * 8/1999 Yamaguchi et al. ......... 356/504

FOREIGN PATENT DOCUMENTS

| JP | 03-115804 | 5/1991 |
| JP | 04-080641 | 3/1992 |
| JP | 04-184207 | 7/1992 |
| JP | 05-071924 | 3/1993 |
| JP | 09-090371 | 4/1997 |
| JP | 10-186330 | 7/1998 |
| JP | 10-232113 | 9/1998 |
| JP | 411344312 A | * 12/1999 |

OTHER PUBLICATIONS

Measurements of empty cell gap for liquid–crystal displays using interferometric methods, Yang, Journal of Applied Physics, Nov. 1988, PP 4780–4781.*

* cited by examiner

Primary Examiner—Samuel A. Turner
(74) Attorney, Agent, or Firm—Nixon & Vanderhye P.C.

(57) ABSTRACT

A method and device for measuring cell gap of a liquid crystal display, the display comprising a pair of substrates with electrodes adhered together forming a predetermined sized cell gap. The device and method includes radiating near-infrared light toward the liquid crystal cell, reflectively interfering the near-infrared light by the cell gap, and analyzing the interference waveform to compute the cell gap size. The device may include an X-Y stage, an FT-NIR spectroscope using near-infrared light as light source, a detector unit for detecting reflected interference light from the liquid crystal cell, and an analyzing computer unit for analyzing and computing cell gap by performing Fourier transformation method or maximum entropy method (MEM) to the interference fringe spectrum.

8 Claims, 12 Drawing Sheets (a)

(b)

(a)

(b)

1

METHOD AND DEVICE FOR MEASURING CELL GAP OF LIQUID CRYSTAL DISPLAY USING NEAR-IR RADIATION

FIELD OF THE INVENTION

The present invention relates to a method and device for measuring the cell gap of a liquid crystal display, a liquid crystal display, and a retardation plate used for measuring the cell gap of a liquid crystal display, which enable accurate measurement of the cell gap.

DESCRIPTION OF THE RELATED ART

Heretofore, various display devices using liquid crystal materials, such as active-driven-type TFT (thin film transistor) display, PALC (plasma address liquid crystal) display, and duty-driven-type STN (super twisted nematic) display, are known. Especially, the PALC elements are switching elements utilizing plasma discharge, which are expected to be applied to very large-sized displays. Unlike TFT, the PALC panel does not involve semiconductor processes during manufacture, and therefore, it may be manufactured at low cost. PALC also draws attention for its possibility to be applied to a large-size LCD with low energy consumption.

The above-mentioned liquid crystal displays are characterized for example by their lightweight, thin form, and low energy consumption. These advantages of the liquid crystal display hold the key to the upcoming multimedia society, and studies related to application of the LCD to various office automation devices and audio visual equipment are now under way. The liquid crystal displays often utilize a TN (twisted nematic) display mode where the nematic liquid crystal molecules are twisted for approximately 90 degrees near both electrode substrates, or an STN display mode where the liquid crystal molecules are twisted for over 180 degrees.

Japanese Patent Application Laid-Open No. 10-186330 discloses a liquid crystal display with a wide viewing angle and a good display quality. According to the disclosed LCD, the cell gap size is closely related for example to the display color, the response speed, and the orientation stability, so there is a need of a more accurate method for measuring the cell gap. Even further, the accurate information of the cell gap value is very important for designing and evaluating the LCD.

Heretofore, cell gap measurement devices in the market were used to compute the cell gap by measuring the retardation of the liquid crystal layer. According to the prior art, the gap of an empty cell with no liquid crystal material injected thereto is measured using optical interferometry, and the gap of a liquid crystal-injected cell is measured using a crystal rotation method.

However, it was difficult to obtain a highly accurate cell gap value according to the empty cell gap measurement using optical interferometry, since the liquid crystal cells were equipped with ITO transparent electrodes, an orientation film, a color filter and so on, which caused multiple interference. The separation of the measured value was complex, and the obtained value was not very accurate.

Further, when liquid crystal is filled inside the liquid crystal cell, the refractive index difference between the liquid crystal layer and the substrate is small. Therefore, hardly any interface reflection occurs at the substrate, and no interference fringe appears, which makes it almost impossible to measure the cell gap of a cell filled with liquid crystal material in principle.

On the other hand, according to the crystal rotation method, it is capable of measuring only Np liquid crystal cells where the dielectric anisotropy of the normally-white liquid crystal is positive. It could not be used to measure Nn liquid crystal cells where the dielectric anisotropy of the cells have negative dielectric anisotropy.

When the liquid crystal being sandwiched between two parallel substrates is uniaxially and horizontally oriented to the substrate, the light coming in from the substrate surface is separated into two components by the refractive index anisotropy of the liquid crystal. Therefore, the cell gap of the liquid crystal cell may be measured by the incident angle dependence of the transmission light intensity.

Japanese Patent Application Laid-Open No. 3-115804 discloses a light-weight small-size cell gap measurement device characterized in superposing a lower transparent insulative substrate of the measurement device and an upper transparent insulative substrate of the liquid crystal panel to be measured, so that the rubbing direction of the upper substrate is orthogonal to the rubbing direction of the lower substrate. Further, two polarizing sheets are mounted to both sides of these panels so that the absorption axis orientation of one sheet is orthogonal to the absorption axis orientation of the other sheet.

Further, Japanese Patent Application Laid-Open No. 4-80641 discloses comparing the value of spectrum transmitted through a liquid crystal cell being mounted between two polarizers, with the value of spectrum transmitted therethrough with the angle of the polarizers being varied by 90 degrees. According to the invention, the optical retardation, the cell gap and the liquid crystal birefringence of the liquid crystal cell may be measured.

Japanese Patent Application Laid-Open No. 4-184207 discloses detecting the transmitted light energy while varying the impressed voltage, and obtaining the voltage value where the transmission is minimum, in order to perform an easy and accurate measurement.

Moreover, Japanese Patent Application Laid-Open No. 5-71924 discloses measuring the gap of a liquid crystal cell including Np liquid crystal with positive dielectric anisotropy, while applying thereto either high voltage which is more than 50 times the threshold voltage, or high magnetic field which is more than fifty times stronger than the magnetic field.

Japanese Patent Application Laid-Open No. 9-90371 discloses a method for manufacturing a liquid crystal display. The invention involves pressurizing an empty cell so as to maintain the inner pressure of the empty cell to be equal to the pressure provided to the cell after filling the cell with liquid crystal components, radiating monochromatic beam to the cell, and observing the distribution of the interference fringes. According to the method, the uniformity of the gap inside the empty cell could be inspected.

Further, Japanese Patent Application Laid-Open No. 10-232113 notices that when ultraviolet light or near-ultraviolet light is radiated to an orientation film, the orientation film generates fluorescence. The invention discloses radiating a spot light to an empty cell, and receiving the fluorescence generated at the surf ace of both orientation films by CCD sensor elements, in order to measure the gap of an empty cell.

As explained, many methods for measuring the cell gap of a liquid crystal cell are proposed.

However, according to the conventional methods, including the optical interferometry method using light source generating visible radiation capable of measuring only empty cells, and the crystal rotation method for measuring the incident angle dependence of the transmission rate with retardation generated in the inner-plane orientation parallel to the substrate when polarized light is radiated to the substrate of an Np liquid crystal cell with molecules oriented horizontally when no voltage is impressed, it was impossible, without impressing electric field or magnetic field thereto, to measure the incident angle dependence of the transmitted light energy, in order to obtain the retardation of the liquid crystal cells having the following characters. That is, according to the conventional method, it was impossible to measure the cell gap of a liquid crystal cell equipped with a color filter, having an uneven color filter surface or an uneven substrate surface for liquid crystal driving elements, having molecules oriented perpendicularly when no voltage is impressed, and including an Nn liquid crystal material having negative dielectric anisotropy. In other words, it was impossible to measure the cell gap when the liquid crystal molecules were oriented perpendicularly to the substrate, since the cell will not have any optical retardation (optical path) in the inner plane orientation of the substrate (isotropic).

SUMMARY OF THE INVENTION

The present invention aims at solving the above-mentioned problems, by providing a method and device for measuring the cell gap of a liquid crystal display, a liquid crystal display, and a retardation plate for a liquid crystal display. The present invention enables to measure the cell gap of a liquid crystal cell accurately and easily, without having to impress voltage to the liquid crystal cell. Since the components of the liquid crystal cell including the glass plate, the color filter, the transparent electrode, and the orientation film are all optically isotropic, the retardation ($d_{LC} \cdot \Delta n$) for only the liquid crystal layer in which liquid crystal molecules exist can be measured, and accordingly, the cell gap may be measured.

The present invention provides a cell gap measurement device for measuring liquid crystal cell gap of a liquid crystal display including a liquid crystal layer having liquid crystal molecules in the liquid crystal region being oriented substantially perpendicularly when no voltage is impressed, and a pair of substrates having the liquid crystal layer sandwiched therebetween; the cell gap measurement device comprising a stage for mounting the liquid crystal cell, a pair of uniaxial retardation plates having retardation in their inner planes being mounted to the outer surfaces of the cell with their slow-phase axis orientations arranged; a light source including a polarizer for radiating to the liquid crystal cell polarized light having an azimuthal orientation at an angle of 44 to 46 degrees to the slow-phase axis orientation of the retardation plates; a photo detector having a photo receptor and an analyze, arranged in cross-Nicol to the polarizer against the polarized light, for detecting transmitted light energy of the polarized light; and a rotation unit for changing the pole-angle-oriented incident angle of the polarized light from the direction perpendicular to the slow-phase axis orientation of the retardation plate.

The present invention provides a cell gap measurement device for a liquid crystal display, wherein the rotation unit rotates the light source and the photo receptor of the photo detector in synchronism, when changing the pole-angle-oriented incident angle of the polarized light.

The present invention provides a cell gap measurement device for a liquid crystal display, wherein the rotation unit changes the pole-angle-oriented incident angle by rotating the stage.

Further, the present invention provides a cell gap measurement device for a liquid crystal display, wherein the light source is either a monochromatic laser light source or a light source equipped with an optical colored filter.

The present invention provides a cell gap measurement device for a liquid crystal display, wherein the light source is equipped with a lamp unit having a Y-luminosity filter. As for the wavelength of the light source, it is preferable to use a monochromatic light generated through a band-pass filter or a monochromatic optical laser.

The present invention further provides a cell gap measurement device for a liquid crystal display, wherein the stage is an X-Y stage equipped with a temperature controller and which enables to measure any point.

Further, the present invention provides a cell gap measurement device for a liquid crystal display, wherein the polarizer may be set to any angle.

The present invention provides a cell gap measurement device for a liquid crystal display, wherein the photo detector comprises a photo diode and a low noise amplifier.

Moreover, the present invention provides a cell gap measurement device for a liquid crystal display, wherein the photo detector comprises a display.

The present invention further provides a method for measuring liquid crystal cell gap of a liquid crystal display including a liquid crystal layer having a liquid crystal material with a refractive index difference $\Delta n$ and liquid crystal molecules in the liquid crystal region being oriented substantially perpendicularly when no voltage is impressed, and a pair of substrates having the liquid crystal layer sandwiched therebetween; the method comprising steps of: mounting, with their slow-phase axis orientations arranged, a pair of uniaxial retardation plates having retardation in their inner planes to both outer surfaces of the liquid crystal cell of the liquid crystal display to be measured; radiating to the liquid crystal cell polarized light, having an azimuthal orientation at an angle of 44 to 46 degrees to the slow-phase axis orientation of the retardation plate, while changing the pole-angle-oriented incident angle of the polarized light from the direction perpendicular to the slow-phase axis orientation of the retardation plate; detecting the transmitted light energy by a photo detector having an analyzer arranged in cross-Nicol to a polarizer of a light source of the polarized light; measuring an optical quenching angle where the detected light energy is either minimum or in a quenching state; obtaining retardation of the liquid crystal cell corresponding to the measured optical quenching angle, based on a calibration curve of the liquid crystal cell retardation and the optical quenching angle corresponding to the gap of the retardation plate; and computing the cell gap based on the obtained liquid crystal cell retardation value and the refractive index difference $\Delta n$ of the liquid crystal material.

The present invention provides a method for measuring cell gap of a liquid crystal display, wherein the calibration curve of the liquid crystal cell retardation and the optical quenching angle corresponding to the gap of the retardation plate is obtained through optical calculation.

The present invention further provides a method for measuring cell gap of a liquid crystal display, wherein the calibration curve of the liquid crystal cell retardation and the optical quenching angle corresponding to the gap of the retardation plate is obtained by measuring the liquid crystal display whose refractive index difference $\Delta n$ and cell gap are known.

The present invention further provides a method for measuring cell gap of a liquid crystal display, wherein the retardation of the mounted uniaxial retardation plate is in the range of 10 nm–50 nm.

Moreover, the present invention provides a liquid crystal display comprising a liquid crystal layer having a liquid crystal material with negative dielectric anisotropy and having liquid crystal molecules in the liquid crystal region being oriented substantially perpendicularly when no voltage is impressed, and a pair of substrates having the liquid crystal layer sandwiched therebetween and equipped with perpendicular orientation films; wherein the liquid crystal display further comprises a pair of uniaxial retardation plates having retardation in their inner planes, the retardation being in the range of 10 nm–50 nm, that is mounted to both outer surfaces of the liquid crystal cell, with the slow-phase axis orientations arranged.

The present invention further provides a retardation plate used in the above method for measuring cell gap of a liquid crystal display, wherein the retardation plate has a retardation in its inner plane, the retardation being in the range of 10 nm–50 nm, and which is uniaxial.

According to another aspect of the present invention, the above-mentioned problems are solved by providing a method and device for measuring the cell gap of a liquid crystal display. The present invention enables to measure the cell gap of a liquid crystal cell accurately, easily and non-destructively in a short time, without having to impress voltage to the liquid crystal cell. Further, the present invention enables to measure the gap of not only empty cells having no liquid crystal material injected thereto, but also cells including a liquid crystal layer to which liquid crystal material is injected. Further, the present invention provides a method and device for measuring the cell gap of any type of liquid crystal display with any liquid crystal material, such as a nematic liquid crystal having either positive or negative dielectric anisotropy, or a ferro electric liquid crystal. Moreover, the elements in the material may be in any state of orientation, including TN, STN, HAN, OCB, and ASM.

In order to solve the above-mentioned problems, the present invention provides a method for measuring cell gap of a liquid crystal display equipped with a pair of substrates with electrodes, that is adhered together to form a cell gap with a predetermined size, and a liquid crystal layer sandwiched between the pair of substrates with electrodes; wherein the cell gap is measured by radiating near-infrared light to a liquid crystal cell, reflectively interfering the near-infrared light by the cell gap, and analyzing the obtained interference waveform to compute the cell gap.

Moreover, the present invention provides a device for measuring cell gap of a liquid crystal display comprising an X-Y stage to which the liquid crystal display including a liquid crystal cell to be measured is set, an FT-NIR spectroscope utilizing near-infrared light as light source, a detector unit for detecting the reflected interference light from the liquid crystal cell, and an analysis computing unit for analyzing the spectrum of the obtained interference fringe and computing the cell gap, based on a peak picking method which measures the interval between a peak and a trough of the spectrum, a Fourier transformation method, or a maximum entropy method (MEM).

Further, the present invention provides a device for measuring cell gap of a liquid crystal display, wherein the liquid crystal cell to be measured is either a liquid crystal cell having liquid crystal material injected to the cell gap, or a liquid crystal cell having no liquid crystal material injected thereto.

Even further, the present invention provides a device for measuring cell gap of a liquid crystal display, wherein the liquid crystal cell to be measured includes a color filter, transparent electrodes, and a perpendicular orientation film or a horizontal orientation film laminated on one glass substrate, and liquid crystal driver elements, picture element electrodes, and an orientation film laminated on another substrate.

The present invention also provides a device for measuring cell gap of a liquid crystal display, wherein the liquid crystal display equipped with the liquid crystal cell to be measured is either a transmission-type liquid crystal display or a reflection-type liquid crystal display utilizing driver elements such as TFT or PALC.

Moreover, the present invention provides a device for measuring cell gap of a liquid crystal display, wherein the liquid crystal cell to be measured comprises liquid crystal molecules having TN, STN, vertical (VA), or hybrid-aligned nematic (HAN) orientation.

The present method and device for measuring cell gap of a liquid crystal display utilizes a Fourier transform-near infrared spectroscope (FT-NIR) using near-infrared light as the light source. The liquid crystal cell gap may be measured by analyzing the waveform (spectrum) of the interference fringe obtained through interference reflection of near-infrared light. A halogen lamp or the like is preferably used as the light source of near-infrared light. The FT-NIR spectroscope utilizes a known interferometer, such as a Michelson interferometer or a Mach-Zehnder interferometer, and further utilizes a He—Ne laser and the like to calibrate the wavelength of the light source. A preferable example of the detector includes semiconductor crystals such as Ge, InSb, and InGaAs.

One example of a known analysis method for computing the cell gap based on an interference fringe spectrum obtained by measuring LCD is the peak picking method, computing the interval between the peak and the trough of the interference fringe. Other methods include the Fourier transformation (FFT) method, which analyzes the frequency of the peak and the trough of the interference fringe, and the maximum entropy method, which performs curve-fitting of the interference fringe waveform.

The present invention utilizes an analysis computing unit for analyzing and computing the cell gap based on the above analysis methods.

The present invention enables to measure a gap in the range of approximately 10 mm$\phi$ to 50 $\mu\phi$. Especially in the range of 1 mm$\phi$ to 50 $\mu\phi$, the present invention may be designed to converge the incident beam by an optical lens, so as to maintain a parallel light, and to further focus the light beam through an aperture. When the beam is not focused during measurement, the measured value shows the average value of the whole measurement region. Especially, when the surface of the color filter or the surface of the liquid crystal driving element substrate of the LCD is uneven, it is preferable to focus the beam to a desired region for measurement.

Moreover, the present invention is preferably equipped with an x-y-z, x-y-z-$\theta$ stage or an x-y stage for focusing on any measurement area, an optical microscope system, a CCD camera for capturing the microscope image, and a monitor.

Even further, the present invention is preferably equipped with a device which automatically controls the position and focus of the device to plural measurement areas, so that the present measurement device may be assembled in a manufacturing line as an inspecting device.

The glass, the transparent macromolecules, the transparent electrodes and the liquid crystal material are all transparent within the near-infrared light region, so the interference waveform will not be influenced greatly by absorption of light by the electron, vibration and rotation of each component. This feature of the invention enables to analyze the cell gap highly accurately. Moreover, since the FT-NIR spectroscope is capable of accurately calibrating each wavelength, the loss of light source intensity is very small.

Even further, since the color filter, the transparent electrodes and the orientation film provide little influence to the interference waveform, the present invention enables to measure the cell gap highly accurately.

Moreover, the present invention is capable of measuring liquid crystal displays equipped with any type of liquid crystal drive elements, including the reflection-type and the transmission-type.

The method of measuring cell gap according to the present invention enables to measure the cell gap of the LCD regardless of the liquid crystal orientation, since little effect is provided to the interference waveform by the liquid crystal material.

Even further, the present invention enables to measure the cell gap in a very short time and non-destructively. The present invention enables the cell gap to be inspected within the manufacturing line. The present invention enables to manufacture the cell gap measurement device at low cost. Moreover, by assembling the present cell gap measurement device with a liquid crystal injector or a gap-forming device for liquid crystal layers, cell gap inspection and liquid crystal injection may be performed simultaneously.

DETAILED DESCRIPTION OF PREFERRED EMBODIMENTS

Embodiment 1 of the present invention will now be explained.

Figure 1:
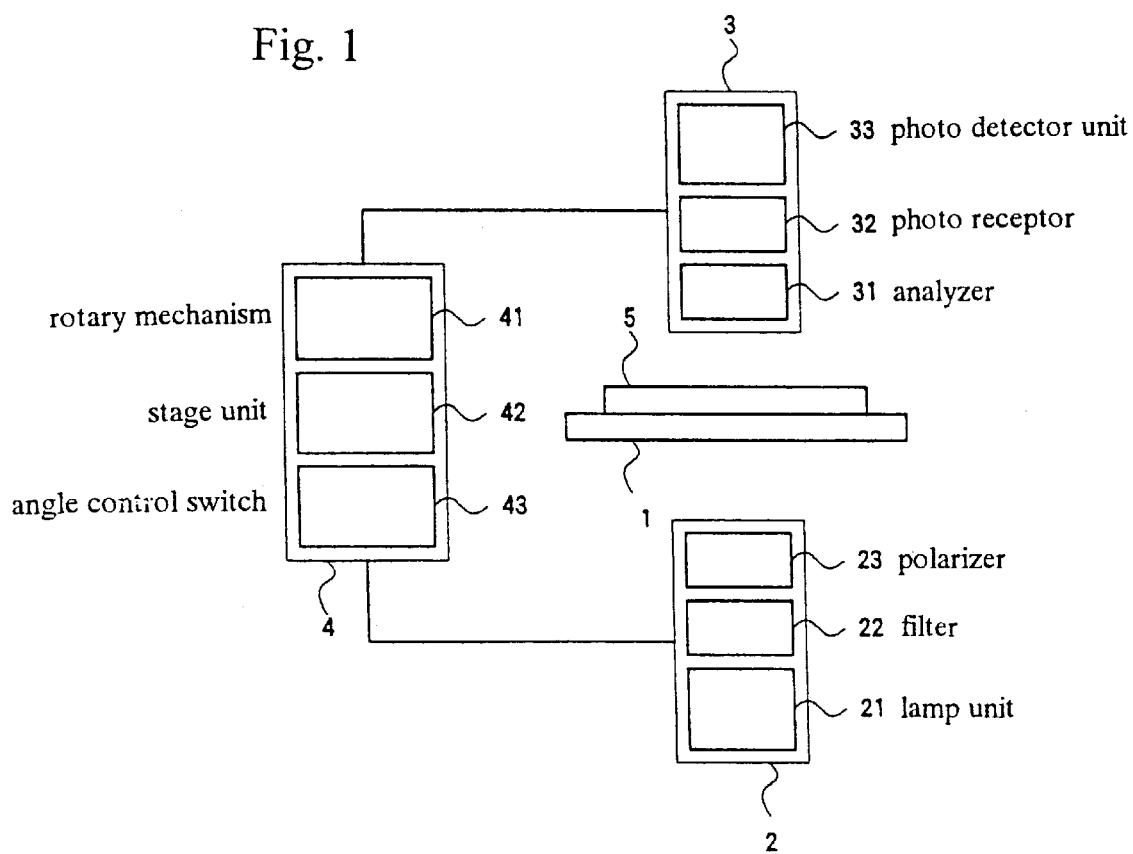
FIG. 1 is a block diagram showing the outline of the cell gap measurement device according to embodiment 1 of the present invention.
Figure 2:
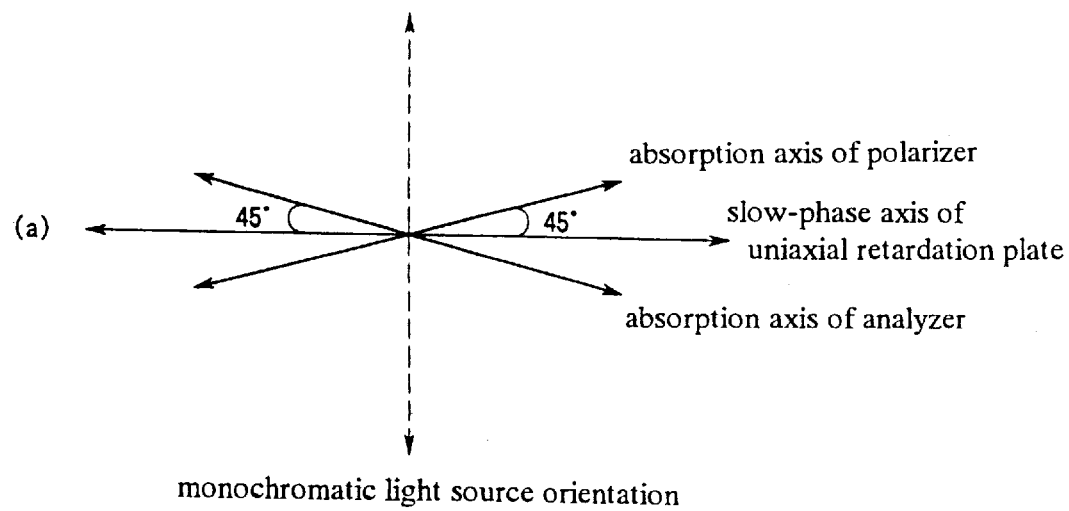
FIG. 2 is an explanatory view showing the orientation of the retardation plate used for measuring the cell gap and the orientation of the pole angle, and at the same time, showing the shape of the liquid crystal display during measurement.
Figure 2:
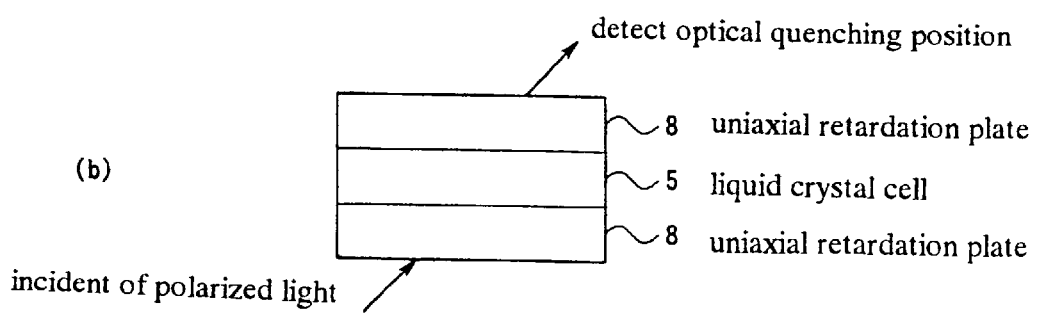
Figure 3:
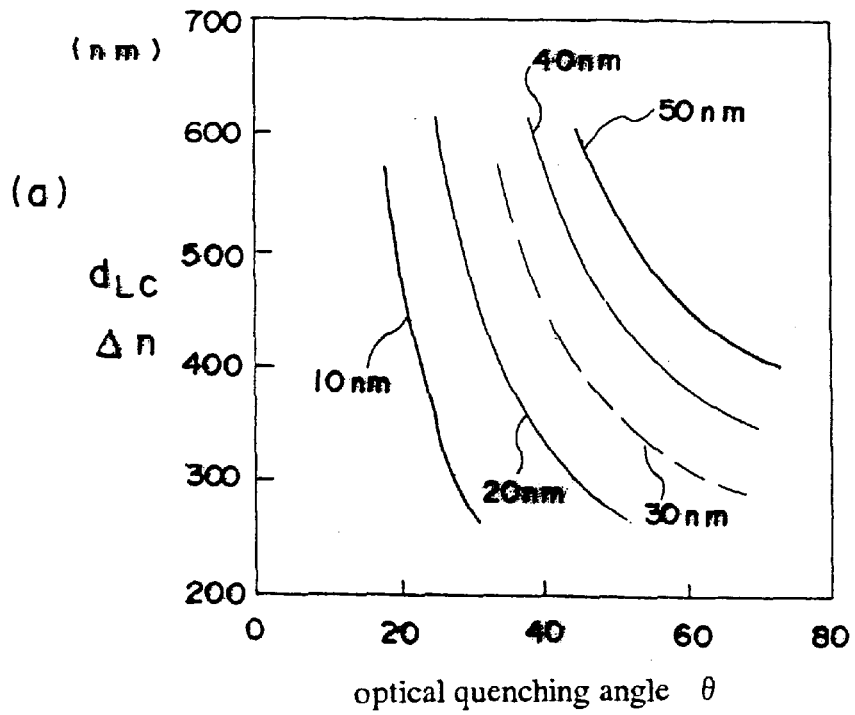
FIG. 3(a) is an explanatory view showing the relation between the optical quenching angle and the liquid crystal retardation.
FIG. 3(b) is an explanatory view showing the relation between the retardation of the retardation plate and the error range of the cell gap value.
Figure 3:
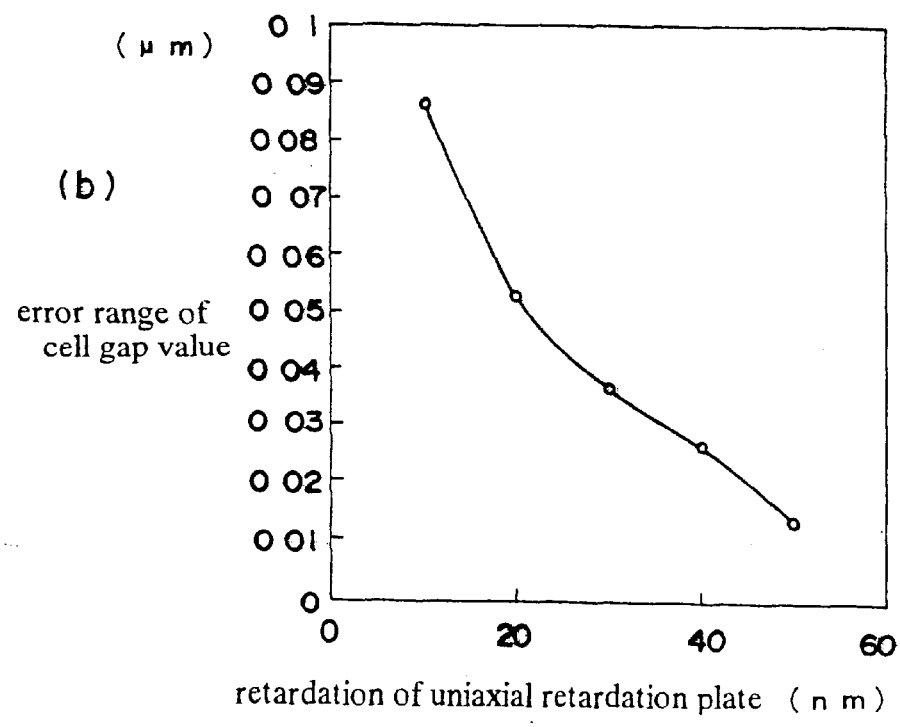

FIGS. 1–3 are referred to in explaining the outline of embodiment 1 of the present invention related to the liquid crystal display (LCD), the method and device for measuring the cell gap of the LCD, and the retardation plate.

As shown in FIG. 1, the cell gap measurement device according to embodiment 1 of the invention relates to measuring the thickness or gap of the liquid crystal cell of a liquid crystal display. The LCD is equipped with a liquid crystal layer having liquid crystal molecules in the liquid crystal region being oriented substantially perpendicularly when no voltage is impressed thereto, and one pair of uniaxial retardation plates having retardation in their inner planes and mounted to both outside surfaces of the substrate having the liquid crystal layer sandwiched therebetween. The measurement device includes an X-Y stage 1 for mounting the liquid crystal cell (liquid crystal display 5), a light source 2, a photo detector 3, and a rotation unit 4.

The liquid crystal cell 5 to be measured is mounted to the X-Y stage 1.

The light source 2 comprises a lamp unit 21, an optical colored filter 22, and a polarizer 23. The light source 2 radiates to the liquid crystal cell 5 monochromatic polarized light with an azimuthal orientation at an angle of 44 to 46 degrees to the slow-phase axis direction of the pair of uniaxial retardation plates having retardation in the inner planes and which is mounted to both outside surfaces of the liquid crystal cell.

The photo detector 3 comprises an analyzer 31 arranged in cross-Nicol to the polarizer 23 against the polarized light, a photo receptor 32, and a photo detecting unit 33, for detecting the energy of transmitted polarized light radiated from the light source 2.

The rotation unit 4 includes a rotating mechanism 41, a stage unit 42 and an angle control switch 43, for rotating the light source 2 and the photo receptor 32 in synchronism, and varying the incident angle of the polarized light in the pole angle direction, from a direction perpendicular to the slow-phase axis orientation of the retardation plate 8.

Uniaxial retardation plates 8 are mounted to both outside surfaces of the liquid crystal display 5 placed on the X-Y stage 15 of the cell gap measurement device during measurement, as shown in FIG. 2(b), so that the retardation axis orientation shown in FIG. 2(a) is approximately 44 to 46 degrees, preferably 45 degrees, to the absorption axis orientation of the polarizer and the analyzer. Then, the monochromatic polarized light output from the light source 2 is radiated thereto, so that the polarizing angle of the light is approximately 44 to 46 degrees, preferably 45 degrees, to the slow-phase axis orientation of the uniaxial retardation plate 8. Moreover, the polarized light from the light source 2 is radiated to the liquid crystal cell 5 so that the pole-angle-oriented incident angle of the light in the direction perpendicular to the slow-phase axis orientation of the retardation plate 8 is gradually varied.

When the pole-angle-oriented incident angle of the polarized light varies from the orientation perpendicular to the slow-phase axis direction of the retardation plate 8, the transmitted light energy detected by the photo detector 3 decreases, and reaches a minimum level or an optical quenching state. Thereby, the optical quenching angle is measured.

According to the present invention, a rotation unit may be used to rotate the X-Y stage 1. The stage 1 may be an X-Y stage capable of measuring any point, and equipped with a temperature controller. Since the refractive index difference $\Delta n$ of the liquid crystal material depends on temperature, it is preferable to have a temperature control device (heater and cooling unit) in order to maintain the liquid crystal display at a constant temperature.

According to the present invention, a monochromatic laser light source may be used as the light source 2. Further, the light source 2 may be equipped with a lamp unit having a Y-luminosity filter. The polarizer 21 may be set to any angle. The optical quenching position is most notable when the incident angle of the monochromatic polarized light from the lamp unit 21 is 45 degrees to the slow-phase axis orientation of the uniaxial retardation plate.

According to the invention, the photo detector 3 may have a photodiode and a low-noise amplifier. The photo detector 3 may also have a display, which is not shown in the drawing.

The present cell gap measurement device has a simple structure, and may be used for liquid crystal cells equipped with color filters. It is also capable of measuring the gap nondestructively and in a short time, without impressing voltage to the LCD. The device could be assembled in the manufacture line, and it may be designed and manufactured at low cost.

The cell gap measurement method according to the present invention is for measuring the liquid crystal cell gap of a liquid crystal display. The display includes a liquid crystal layer having a liquid crystal material with a refractive index difference $\Delta n$ and liquid crystal molecules in the liquid crystal region being oriented substantially perpendicularly when no voltage is impressed, and a pair of substrates having the liquid crystal layer sandwiched therebetween. A pair of uniaxial retardation plates with a predetermined thickness and having retardation in their inner planes is mounted, with their slow-phase axis orientations arranged, to both outer surfaces of the liquid crystal cell of the display to be measured. Next, polarized light with an azimuthal orientation at an angle of 44 to 46 degrees to the slow-phase axis orientation of the retardation plate is radiated to the liquid crystal cell, while the pole-angle-oriented incident angle is varied from a direction perpendicular to the slow-phase axis of the retardation plate. On the other hand, a photo detector having an analyzer arranged in cross-Nicol to the polarizer of the light source of the polarized light is utilized to measure the transmitted light energy. The optical quenching angle is measured where the measured light energy is minimum or quenched. Then, the retardation of the liquid crystal cell corresponding to the measured quenching angle is obtained based on a calibration curve of the optical quenching angle and the cell retardation corresponding to the gap of the retardation plate. Next, the obtained cell retardation value and the refractive index difference $\Delta n$ of the liquid crystal material is used to compute the cell gap.

The calibration curve of the cell retardation and the optical quenching angle corresponding to the gap of the retardation plate can be obtained through optical calculation.

Further, said calibration curve of the cell retardation and the optical quenching angle corresponding to the retardation plate gap may be obtained by measuring the liquid crystal display having a known refractive index difference $\Delta n$ and a known cell gap. The retardation of the uniaxial retardation plate being mounted may range from 10 nm to 50 nm.

Accordingly, the cell gap may be detected during the process for manufacturing panels. Since the control of cell gap relates greatly to the display characteristics and the display quality, the present method contributes to improve the quality administration and the yield factor of the liquid crystal display greatly.

The liquid crystal display to be measured by the present invention comprises a liquid crystal layer including liquid crystal material having a negative dielectric anisotropy and having liquid crystal molecules in the liquid crystal region being oriented substantially perpendicularly when no voltage is impressed, and a pair of substrates having the liquid crystal layer sandwiched therebetween and also having a perpendicular orientation film. When measuring the cell gap, one pair of uniaxial retardation plates having a retardation of 10 nm–50 nm in the inner planes is mounted, with their slow-phase axis orientations arranged, to both outer surfaces of the liquid crystal cell of the display to be measured. Further, the retardation plates used in the measuring step of the present invention has retardation in their inner planes, the retardation of which is 10–50 nm, and are uniaxial. The uniaxial retardation plate may be in the form of a plate, or a film adhered to a glass panel.

The cell-gap measurement principle for the liquid crystal display according to the invention will now be explained. On the liquid crystal panel of the LCD 5 to be measured, uniaxial retardation plates 8 having retardation in their inner planes (retardation: 10 nm–50 nm) are mounted to both outer surfaces of the panel with their axial orientations arranged. The liquid crystal display is then set to a sample stage (X-Y stage) 1. The monochromatic light coming out from the light source 2 is radiated to the LCD 5. The light output from the lamp unit 21 of the light source 2 becomes monochromatic by a filter 22. Then, the monochromatic light is polarized by the polarizer 23, so that it has an angle of 45 degrees to the slow-phase axis orientation of the retardation plate 8 mounted to the LCD 5, before being radiated to the LCD 5. The polarized light transmitted through the LCD 5 is also transmitted through the analyzer 31 of the photo detector 3, and reaches the receptor 32. The transmitted light energy is detected by the photo detector unit 23.

The analyzer 31 is arranged so that it is cross-Nicol to the polarizer 21. The uniaxial retardation plates 8 are, as shown in FIG. 2(a), mounted to both outer surfaces of the liquid crystal cell 5 so that their slow-phase axial orientation is set to 45 degrees to the absorption axis orientation of the polarizer and the analyzer. Therefore, the monochromatic polarized light from the light source 2 is polarized so that it is 45 degrees to the slow-phase axis orientation of the uniaxial retardation plate. Further, the output-side polarizing angle of the monochromatic polarized light from the light source 2 is varied according to the change in pole-angle-oriented incident angle, while the pole-angle-oriented incident angle of the polarized light is gradually varied from a direction perpendicular to the slow-phase axis orientation of the retardation plate 8. The change in light energy of the monochromatic polarized light radiated from the light source 2 according to the change in pole-angle-oriented incident angle is measured. Thereby, the optical quenching angle is detected, where the measured light energy (or transmission rate) is minimum or in a quenched state.

One example of the calibration curve related to the pole-angle-oriented incident angle (tilt angle) and the cell gap used in the present invention is explained.

The set parameter of the analyzing cell is as follows: no voltage (0 V), cell gap 3 μm–8 μm, liquid crystal property constant (chiral length: −24 μm, refractive index no: 1.47914, ne: 1.55284, Δn: 0.0737), and equalized state of initial distribution of liquid crystal director (pre-tilt angle: 90 degrees, twist angle: −90 degrees). By solving the energy equation of Gibbs, Helmholts, the orientation distribution of the liquid crystal director is calculated. Next, by using the refractive index and gap of the polarizer and the retardation plate and the orientation distribution of the liquid crystal director as parameters, the transmission rate of the transmission-type display model is calculated by use of a 2×2 determinant of expanded Jones matrix method, for the case where the orientation and the tilt angle is 90 degrees to the slow-phase axis of the uniaxial retardation plate (inner plane retardation: 10 nm–50 nm).

The tilt angle of the polarized incident light at the time of minimum transmission rate, or in other words, the optical quenching position angle θ (unit: degrees), is plotted to the retardation $d_{LC} \cdot \Delta n$ of the liquid crystal cell to obtain FIG. 3(a). At this time, the following third order polynomial approximation is performed for the curved lines of each retardation of the uniaxial retardation plate (10 nm–50 nm) The calibration curves of the following equations (1)–(5) are obtained.

10 nm: $d_{LC} \cdot \Delta n \approx -0.0279\theta^3 + 3.3896\theta^2 - 137.96\theta + 2113.2$ (1)

20 nm: $d_{LC} \cdot \Delta n \approx -0.0174\theta^3 + 2.4934\theta^2 - 124.48\theta + 2434.7$ (2)

30 nm: $d_{LC} \cdot \Delta n \approx -0.0064\theta^3 + 1.2130\theta^2 - 80.123\theta + 2126.9$ (3)

40 nm: $d_{LC} \cdot \Delta n \approx -0.0060\theta^3 + 1.2056\theta^2 - 84.843\theta + 2419.5$ (4)

50 nm: $d_{LC} \cdot \Delta n \approx -0.0044\theta^3 + 0.9870\theta^2 - 76.648\theta + 2452.0$ (5)

Each of the above calibration curves were same approximation equations, even when the refractive index difference Δn of the liquid crystal material differed.

Next, the effect that the measurement error of the optical quenching angle provides to the calculated value of the cell gap will be explained. At first, a liquid crystal cell of $d_{LC} \cdot \Delta n = 442.2$ nm, wherein Δn is known, is used to measure the optical quenching angle θ of each retardation plate. The light source is provided with a band path filter generating a monochromatic light of 544 nm. Next, $d_{LC} \cdot \Delta n$ is calculated based on each approximation equation (1) to (5) with the optical quenching angle set to $\theta_0$ and ($\theta_0 \pm 0.1$), assuming that the measurement error of the measured quenching position angle $\theta_0$ is ±0.1 degrees. Based on known Δn, the cell gap and the cell gap error range is calculated. The obtained cell gap error range and each retardation plate is plotted in FIG. 3(b). As shown in FIG. 3(b), the error range is smaller when the retardation of the uniaxial retardation plate is larger. From the chart of FIG. 3(b), when $d_{LC} \cdot \Delta n$ is in the range of 300 nm–500 nm, the calculated cell gap error range is equal to or below 0.1 μm. Therefore, the preferable range of the retardation is 10 nm–50 nm.

Especially, when $d_{LC} \cdot \Delta n$ is in the range of 350 nm–550 nm, the optical quenching position should preferably be within 60 degrees, considering the design of the device for measuring the quenching position. From the results shown in FIG. 3(a), the retardation of the plate should preferably be equal to or below 40 nm. Further, from the results shown in FIG. 3(b), the retardation of the plate, on condition that the error range of the cell gap value is equal to or below 0.05 μm, is equal to or above 20 nm. From the above, the more preferable retardation range of the uniaxial retardation plate is 20 nm–40 nm. When the retardation is within the most preferable range of 30 nm–40 nm, the cell gap may be measured highly accurately with the $d_{LC} \cdot \Delta n$ in the range of 400 nm–550 nm.

According to the above explanation, the calibration curve of the liquid crystal cell retardation $d_{LC} \cdot \Delta n$ which is the function of the optical quenching angle θ is obtained through optical calculation. Further, the optical quenching angle of the liquid crystal cell is measured, and based on the calibration curve and the refractive index difference Δn of the liquid crystal material, the cell gap $d_{LC}$ is calculated. However, it is possible to obtain a calibration curve by measuring the optical quenching angle θ using a liquid crystal display with a known refractive index difference Δn and a known cell gap $d_{LC}$, without performing any optical calculation.

Next, an embodiment of the LCD, the device and method for measuring the cell gap, and the retardation plate according to the invention will now be explained with reference to FIGS. 4–9.

Figure 4:
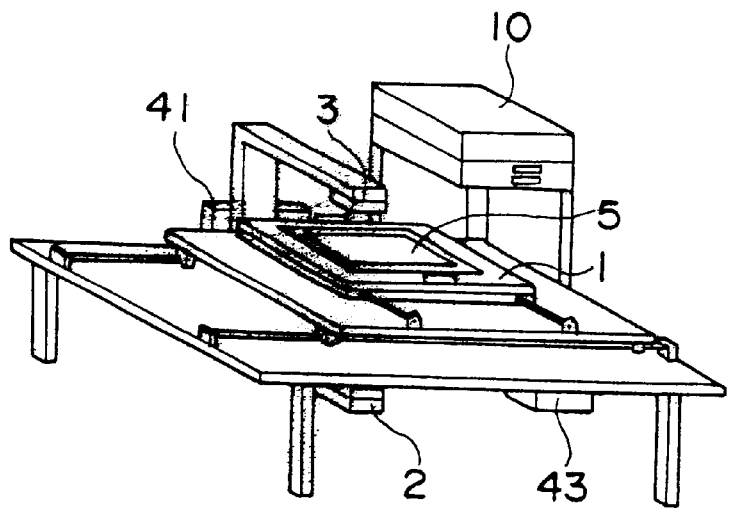
FIG. 4 is a perspective view showing the exterior shape of the cell gap measurement device according to embodiment 1.

Embodiment 1 will now be explained. The cell gap measurement device according to the present embodiment is equipped with an X-Y stage 1, a light source 2, a photo detector 3, a rotation unit, a controller 10, and so on, as shown in FIG. 4.

The X-Y stage 1 is a sample XY stage, on which is set the LCD 5 for measurement. The stage may be moved so as to measure any point of the whole surface of the LCD.

The light source 2 comprises a lamp unit, a filter for outputting a monochromatic 544 nm light, a polarizer, and so on. The light source 2 radiates polarized light for measuring the cell gap to the liquid crystal cell 5. The filter is, for example, a Y-luminosity filter which is mounted to the lamp unit, for making the light from the lamp unit monochromatic. The polarizer is mounted at a predetermined angle so as to polarize the monochromatic light from the lamp unit.

The photo detector 3 comprises an analyzer, a photoreceptor, a photo detector unit, and so on. The transmitted light energy may be measured with high accuracy by using a display and utilizing photodiode and low noise amplifier. Thereby, the transmission rate and the rotation angle may be read in directly. The analyzer is set at an angle cross-Nicol to the polarizer. The photoreceptor receives the transmitted light from the LCD 5. The photo detector unit determines the minimum or optical quenching state of the transmitted light energy received by the photoreceptor.

The rotation unit comprises a rotary mechanism 41, a stage unit, an angle control switch 43, and the like. By rotating the light source 2 and the photoreceptor, the incident angle of the light in the pole-angle-orientation to the LCD 5 may be varied. The angle control switch 43 is for changing the angle of the rotary axis of the rotary mechanism 41. The controller 10 includes a heater and a cooling unit and the like, and controls the whole cell gap measurement device.

Figure 5:
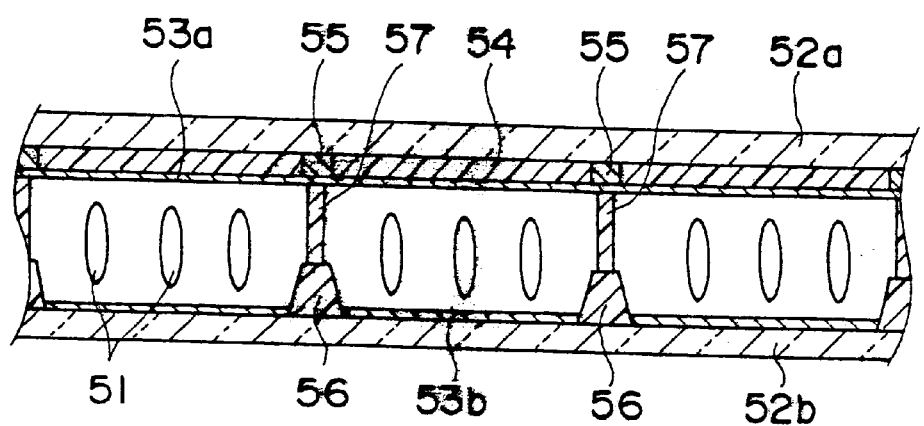
FIG. 5 is a vertical cross-sectional view showing in enlarged view the structure of the LCD to be used for cell gap measurement according to embodiment 1.

The measurement performed by the cell gap measurement device according to embodiment 1 will now be explained. The LCD 5 to be measured comprises, as shown in FIG. 5, a liquid crystal material 51, a pair of upper and lower glass substrates 52a, 52b, transparent electrodes 53a, 53b, CF (color filter) layer 54, BM (black matrix) 55, a first convex portion 56, a column 57, and the like. The liquid crystal material 51 includes a liquid crystal layer having a liquid crystal material with a negative dielectric anisotropy, wherein the liquid crystal molecules in the liquid crystal region are roughly perpendicular when no voltage is impressed. A pair of vertical orientation films having the liquid crystal layer sandwiched therebetween (not shown) is mounted to the pair of upper and lower glass substrates 52a and 52b.

Figure 6:
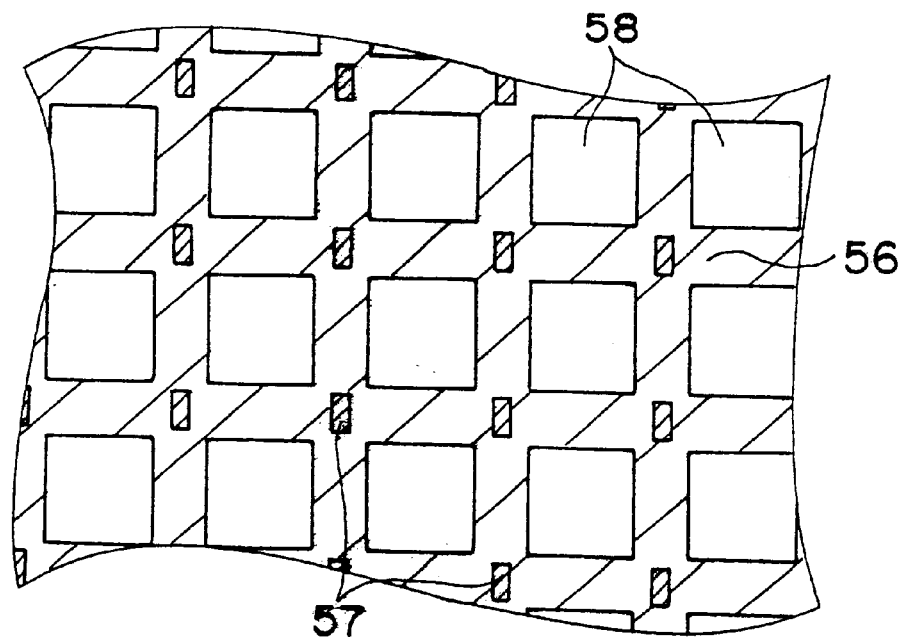
FIG. 6 is an explanatory view showing the convex pattern of the LCD to be used for cell gap measurement according to embodiment 1.

One example for manufacturing the present liquid crystal display 5 will now be explained. On the glass substrate 52b positioned so as to oppose to a BM 55 formed on the glass substrate 52a, a first convex 56 in a 1 μm grid-state is formed by a photolithography process. A photo-curing polyimide material or an acrylic photosensitive material is used as a resin for forming the first convex 56. Further, on the grid-shape first convex 56, a cell gap control unit of a second convex having a thickness of 5 μm is formed by a photolithography process, thereby forming the column 57. The pattern of the formed first convex 56, the column 57 and the opening (picture element) 58 is shown in FIG. 6. A contact-type step height meter is used to measure the thickness of each convex 56 and 57. Next, a transparent electrode 53b is formed. It is also possible to form the convex 56, 57 after forming the transparent electrode 53b.

The steps for manufacturing the substrate 52a with a CF layer 54 include forming a color filter (CF) layer 54 and BM 55 on the substrate 52a. Then, a transparent electrode 53a, made for example of ITO, is formed.

The substrate 52b equipped with said convex portions 56, 57 is opposed to the 5.6-type TFT substrate 52a having a CF layer 54, and they are adhered together by use of a sealing material.

Figure 7:
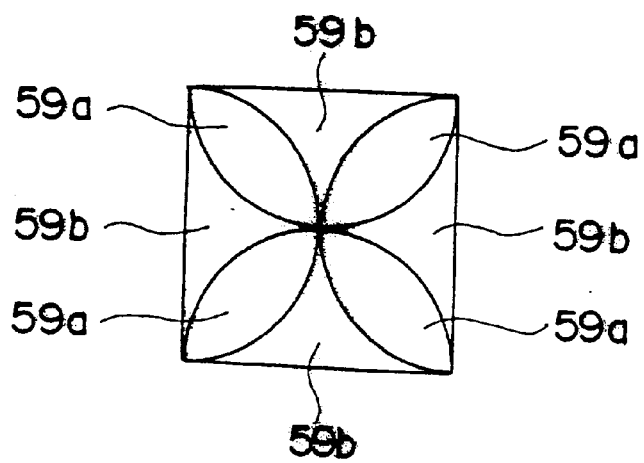
FIG. 7 is an explanatory view showing the axial symmetry display mode of the LCD to be used for cell gap measurement according to embodiment 1.

A liquid crystal material including a photo-curing resin and a photo polymerization initiator (liquid crystal precursor mixture) is injected to the space formed between the transparent electrodes 52a and 52b. Then, voltage approximate the liquid crystal threshold is impressed thereto, which is then exposed to ultraviolet. Thereby, the axial symmetry orientation of the display is stabilized. As a result, when voltage is impressed, a stable axial symmetry orientation including a black portion 59a and a white portion 59b is obtained, as shown in FIG. 7.

The cell gap of the LCD formed by the above process is measured using the cell gap measurement device according to embodiment 1, under an atmosphere of 25 degrees room temperature. A pair of uniaxial retardation plates 8 with a predetermined thickness and having retardation (21 nm) in their inner planes is mounted to both outer surfaces of the liquid crystal cell 5. Next, the transmission light energy of the monochromatic light from the lamp unit corresponding to the inclined angle, that is, the polarized-light-incident-angle dependency of the transmission rate of the liquid crystal cell, is measured, and the tilt angle of the minimum transmission rate or optical quenching angle of (36.2 degrees±0.1 degrees) is obtained.

Figure 8:
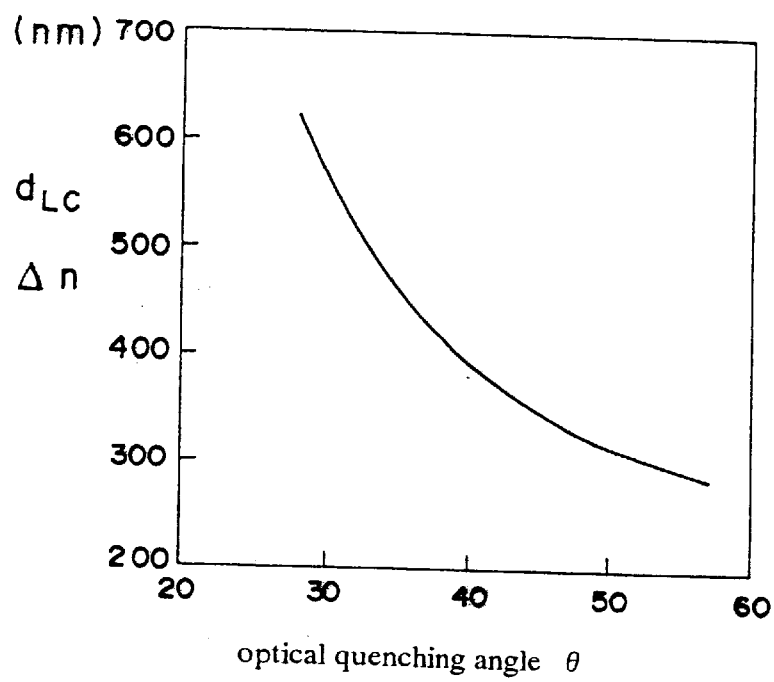
FIG. 8 is an explanatory view showing the relation between the liquid crystal retardation and the optical quenching angle when the retardation of the plate is 21 nm, according to embodiment 1.

From the measured value and the calibration curve shown in FIG. 8 or corresponding approximation equation (6), the cell gap is calculated.

$$d_{LC} \cdot \Delta n \approx -0.013\theta^3 + 2.0539\theta^2 - 113.07\theta + 2460.6 \quad (6)$$

Simultaneously, the cell gap is calculated based on the optical quenching angle θ, the $d_{LC} \cdot \Delta n$ calibration curve, and $\Delta n = 0.0737$ calculated by optical calculation in advance based on the above-mentioned LCD and measurement form, and the result was 6.00 μm±0.02 μm. Since an electrooptical display characteristic that is same as the set value of the cell gap is obtained, it could be said that the value obtained by using the cell gap measurement device according to embodiment 1 is appropriate.

The cell gap measurement device for liquid crystal cells according to the present embodiment is not limited to measuring only the cells shown in FIGS. 5 and 6, but it can also measure any LCD in which the liquid crystal molecules are oriented perpendicularly to the substrate. Embodiment 2 will now be explained, which shows an example of measuring the cell gap of another type of LCD.

Figure 9:
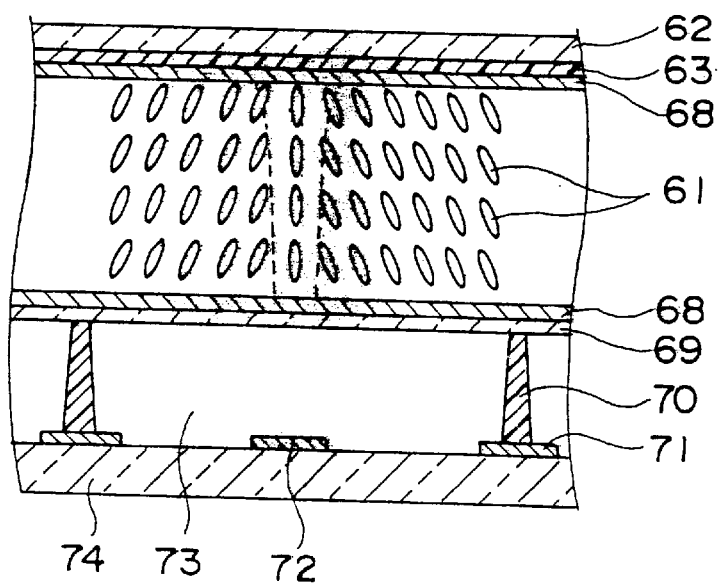
FIG. 9 is a vertical cross-sectional view showing in enlarged view the structure of the LCD to be used for cell gap measurement according to embodiment 2.

In embodiment 2, the measured object is a liquid crystal display utilizing PALC (plasma address liquid crystal elements), instead of the liquid crystal driver elements TFT of embodiment 1. The PALC liquid crystal display utilized for measurement comprises, as shown in FIG. 9, a liquid crystal material 61, a color filter (CF) substrate 62, an ITO electrode 63 which is a transparent electrode, a perpendicular orientation layer 68, a thin plate glass 69, a plasma wall (rib) 70, an anode electrode 71, a cathode electrode 72, a plasma-gas filling channel 73, a plasma support substrate 74, and so on.

The liquid crystal display includes a substrate 62 made for example of transparent glass on one side of the liquid crystal material 61 (upper side of the drawing). On the other side of the material 61 (lower side of the drawing) is a plasma generation substrate, having a thin plate glass 69 as a dielectric sheet and a plasma support substrate 74 being opposed to each other. A plurality of separation walls 70 are arranged in lines between the plasma support substrate 74 and the thin plate glass 69. The space surrounded by the wall 70, the plasma support substrate 74 and the glass 69 constitute channels 73 arranged in lines, and filled with plasma gas. In every channel are an anode electrode 71 and a cathode electrode 72 for forming plasma gas. The PALC substrate is manufactured according to the known art.

On the side of the liquid crystal layer of the CF substrate 62 is mounted a color filter (CF). On the filter are formed transparent electrodes 63 in striped forms, functioning as data lines. The electrodes are arranged to cross the lines of plasma channels 73, for example in perpendicular orientation (direction orthogonal to the extending direction of the plasma channels). The liquid crystal material 61 is sandwiched between the CF substrate 62 and the thin plate glass 69. The cell gap between the CF substrate 62 and the glass 69 is controlled by first and second convex portions (not shown), similar to embodiment 1. Perpendicular orientation layers 68, 68 are each formed to the surface of the liquid crystal layer of the glass 69 and the CF substrate 62. Further, the CF substrate 62, the ITO electrode 63 and the liquid crystal material 61 constitute a liquid crystal cell. Since the LCD formed as above includes perpendicular orientation layers 68 mounted on the surfaces of the thin plate glass 69 and the CF substrate 62 contacting the liquid crystal layer, when a liquid crystal material 61 having negative dielectric anisotropy is used, the liquid crystal molecules will be oriented perpendicularly to the substrate 62 when no voltage is impressed.

The cell gap of the PALC liquid crystal display having retardation plates mounted to both sides thereof is measured using the same cell gap measurement device used in embodiment 1. The result of measurement of the cell gap will now be explained. Upon measurement, the tilt angle of the polarized light is set to be parallel to the plasma rib 70, and the slow-phase axis of the retardation plate 8 and the absorption axis of the polarizer and the analyzer are arranged to have the relation as explained in FIG. 2. The cell gap measurement device explained in embodiment 1 and FIG. 4 is used to measure the polarized-light tilt-angle dependence of the transmission rate for the LCD of embodiment 2. The tilt angle of the minimum transmission rate, or optical quenching angle (36.2 degrees±0.1 degrees), is obtained. Simultaneously, based on the LCD to be measured and the used retardation plate (retardation: 21 nm), the cell gap is computed from the calibration curve (refer to FIG. 6 and approximation equation (6)) related to the $d_{LC} \cdot \Delta n$ and the optical quenching angle obtained from optical calculation, and from $\Delta n = 0.0737$. The result is 6.00 $\mu m \pm 0.02$ $\mu m$.

A contact-type step height meter is used for measurement, and the cell gap control unit (sum thickness of first convex portion and second convex portion) was 6.0 $\mu m$. It is proved that the value obtained according to the cell gap measurement of embodiment 2 is appropriate. Accordingly, the present method for measuring cell gap is also capable of measuring the cell gap of a PALC-type liquid crystal display.

A comparative example is explained. The cell gap of the liquid crystal displays used in present embodiments 1 and 2 were measured using a cell gap measurement device sold in the market using optical interferometry. No appropriate values could be obtained.

The third embodiment of the present invention will now be explained.

Figure 10:
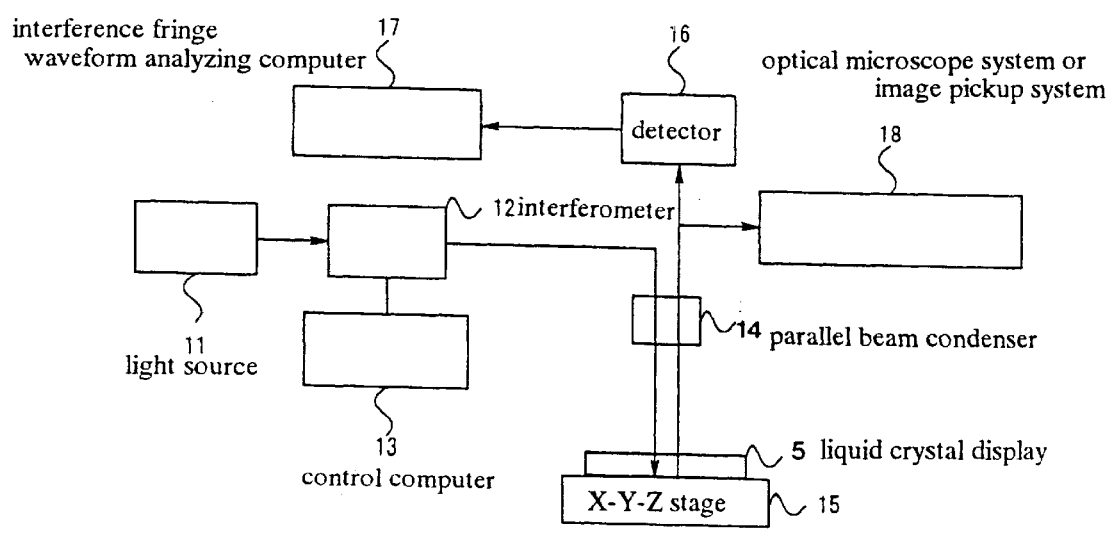
FIG. 10 is a block diagram showing the outline structure of the measurement device used in the method of measuring cell gap of a liquid crystal display according to embodiment 3 of the present invention.

FIGS. 10 through 18 are referred to in explaining the third embodiment of the method and device for measuring the cell gap of a liquid crystal display according to the present invention. In order to help understand the method and device for measuring the liquid crystal display (LCD) according to the present invention, the basic measurement method and device is explained with reference to the concept diagram of measurement shown in FIG. 10. As shown in FIG. 10, one example of the measurement device comprises for example a light source 11, an interferometer 12, a control computer 13, a parallel beam condenser 14, a sample stage comprising x-y-z stage 15, a detector 16, an interference fringe waveform analyzing computer 17, and an optical microscope system or image pickup system 18.

The liquid crystal display 5 to be measured is set on the sample stage 15. The wavelength of the near-infrared light output from the light source 11 is calibrated by the interferometer 12. The radiated near-infrared light passes through the LCD 5, then it is reflected, and the transmitted light energy is detected by the detector 16. The sample stage 15 is an x-y-z stage, which enables any point in the whole surface of the LCD 2 to be measured. Further, spectrum data can be obtained as interference fringe waveform for each wavelength or wave frequency. An FFT process is performed to the spectrum data.

At this time, all analysis parameters are set as follows: the refractive index of the liquid crystal material is 1.5, the film thickness of ITO is 250 nm and the refractive index thereof is 1.8, the film thickness of the color filter (CF) is 1 $\mu m$ and the refractive index thereof is 1.6, and the film thickness of the orientation film is 100 nm and the refractive index thereof is 1.6.

The cell gap may be computed by dividing the analyzed and computed optical gap (effective cell gap: cell gap X refractive index) by the refractive index of the liquid crystal material. The cell gap at the measurement position may be computed by analyzing the obtained interference fringe waveform.

Figure 11:
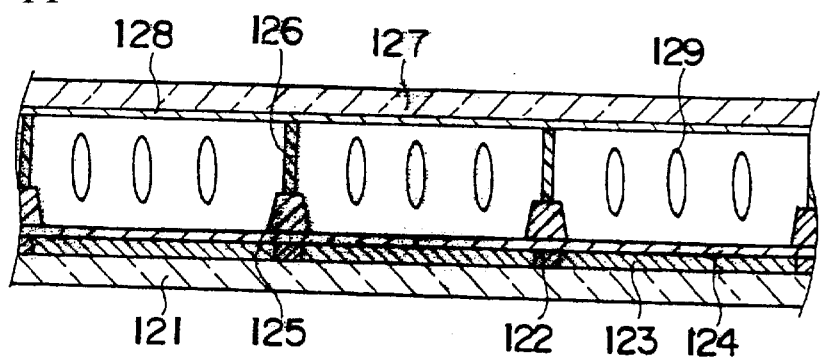
FIG. 11 is a cross-sectional view showing one typical example of the structure of a liquid crystal display, which is to be measured according to the measurement method of embodiment 3.

Embodiment 3 utilizing the method of measuring cell gap of a liquid crystal display according to the present invention will now be explained. The LCD used in the present embodiment will be explained with reference to FIGS. 11–13. As shown in FIG. 11, the liquid crystal cell of the LCD comprises a color filter (CF) substrate (first glass substrate) 121, a blackmask (BM) 122, a color filter (CF) layer 123, a first transparent electrode 124, a convex portion (wall) 125, a column 126, a second glass substrate 127, a second transparent electrode 128, and a liquid crystal 129.

Figure 12:
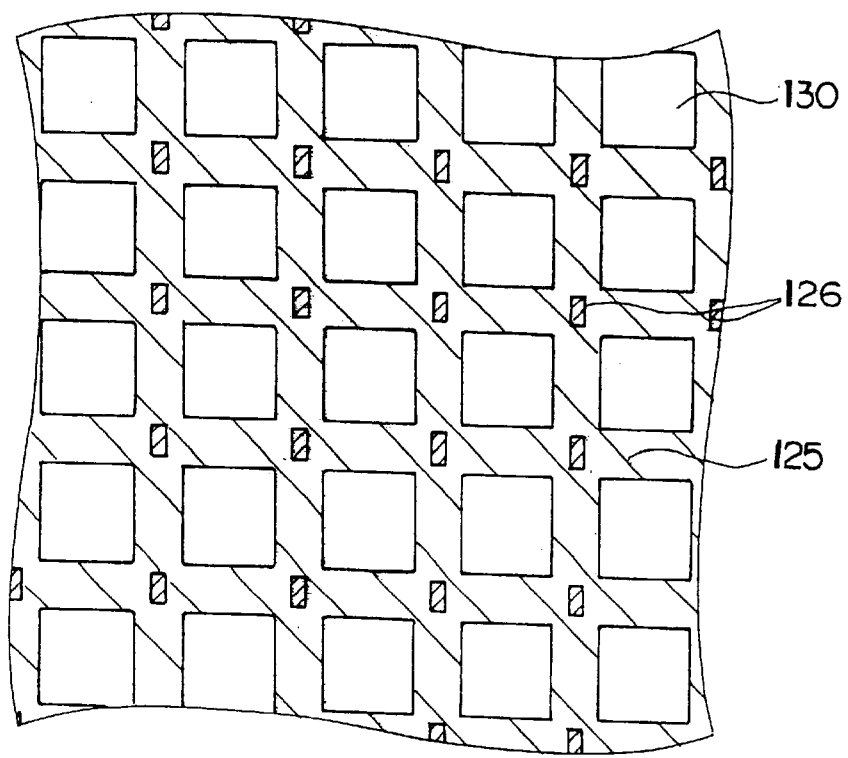
FIG. 12 is a top view showing the convex portion pattern in the liquid crystal display according to FIG. 11.

On the BM 122 formed in a matrix-state on the first glass substrate (CF substrate) 121, a convex portion 125 having a 1 $\mu m$ grid-shape is formed by a photolithography process. A photo-curing polyimide material or an acrylic photosensitive material is used as the material resin. Further, on the grid-shape convex portion 125, a cell gap control unit of a second convex portion (column) 126 having a thickness of 5 $\mu m$ is formed by a photolithography process. One example of the pattern of the second convex portion (column) 126 is shown in FIG. 12. A contact-type step height meter is used to measure the thickness of each convex portion.

A black mask 122 having openings 130 in matrix-state is formed on the surface of the first glass substrate (CF substrate) 121. A color filter layer 123 is formed to the openings 130 of the black mask 122. The first convex portion 125 is formed on the black mask 122, then a first transparent electrode 124 is formed on the color filter layer 123 by using a transparent electrode material, such as ITO. Thereafter, as shown in FIG. 12, the second convex portion 126 is formed on the first convex portion 125. By adjusting the thickness of the second convex portion 126, a CF substrate 121 assembly is formed with a cell gap control of 3 $\mu m$–9 $\mu m$, which is the sum thickness of the first convex portion 125 and the second convex portion 126. The black matrix 125 is equipped with openings 130.

The CF substrate assembly 121 with first and second convex portions is opposed to the electrode substrate (second glass substrate) 127 equipped with second transparent electrode 128, and they are adhered together by use of a sealing material. A liquid crystal material (liquid crystal precursor mixture) 129 including a photo-curing resin and a photo polymerization initiator is injected to the cell gap formed between the first transparent electrode 124 and the second transparent electrode 128. Then, voltage approximate the threshold of the liquid crystal material is impressed thereto, which is then exposed to ultraviolet. Thereby, the axial symmetry orientation of the display is stabilized.

Figure 13:
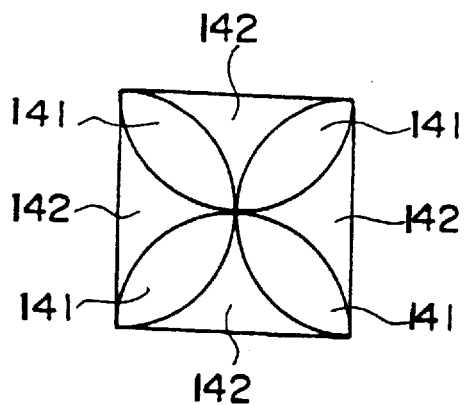
FIG. 13 is an explanatory view showing the appearance of axial symmetry display mode of the liquid crystal display measured according to embodiment 3, observed in parallel-Nicol to the polarizing plate while impressing voltage thereto.

By impressing voltage to the LCD and observing it in parallel-Nicol to the polarizing plate, a stable axial symmetry orientation including a black portion 141 and a white portion 142 is observed, as shown in FIG. 13. Accordingly, it is proved that an axial symmetry oriented liquid crystal cell is obtained by the above-explained process.

The cell gap of the LCD formed by the above manufacturing process is obtained using the above cell gap measurement device shown in FIG. 10, under an atmosphere of 25 degrees room temperature. Before and after injecting the liquid crystal material, the above measurement device (FIG. 10) is used to measure the interference fringe while focusing on any opening portion 130, and an FFT process is performed to the obtained interference fringe waveform, in order to compute the cell gap.

Figure 14:
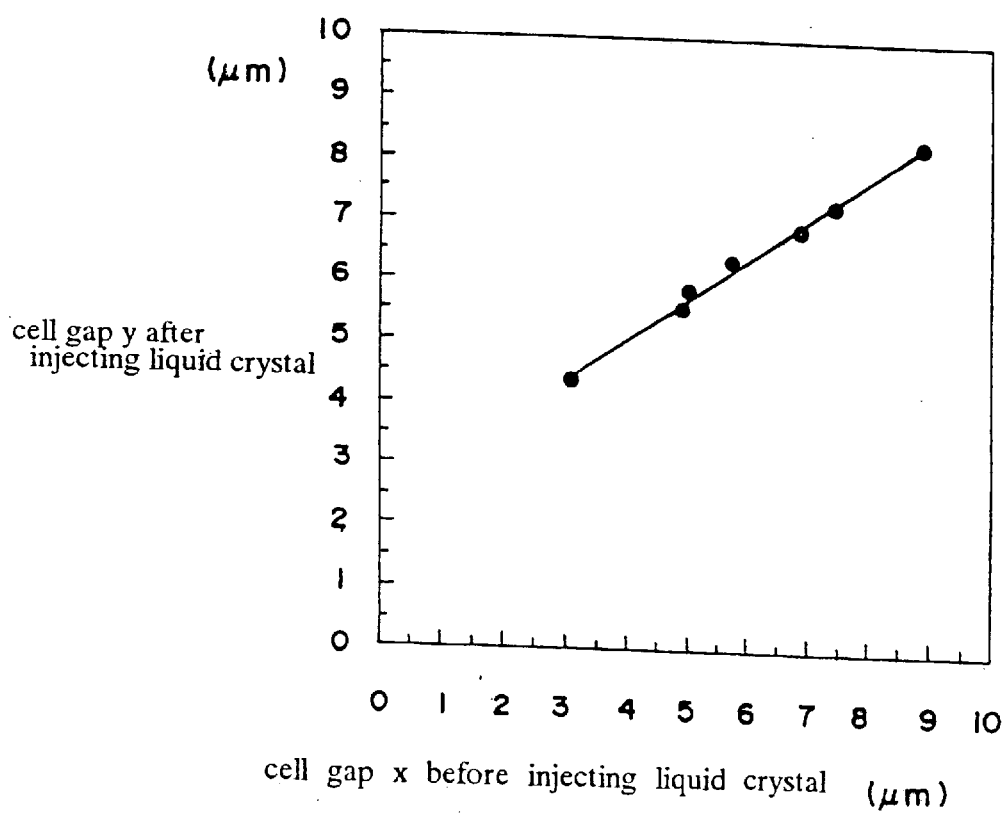
FIG. 14 is an explanatory view showing the relation between the result of cell gap measurement according to the invention when liquid crystal is injected to the cell gap and the result of cell gap measurement when liquid crystal is not injected thereto.

As the result of measurement, the measured value of the cell gap after injecting liquid crystal material is plotted to the measured value of the empty cell, with no liquid crystal material injected thereto. The result is shown in FIG. 14. The measured value of the cell gap (y) of the liquid crystal-injected cell tended to be greater when the empty cell gap (x) was smaller than 7 μm, and tended to be smaller when the empty cell gap (x) was equal to or greater than 7 μm (y=0.6661x+2.3464).

Further, using a least-squares method, linear regression calculation is performed to the plotted data. The coefficient of determination (or coefficient of positivity) $R^2$ was a value very close to 1 (0.9942).

Actually, since it is necessary to relatively evaluate the cell gap in correspondence with the optical property, and since FIG. 14 shows a very good linear relation, it could be said the method according to embodiment 3 is capable of measuring the cell gap with high accuracy.

The method for measuring cell gap of a liquid crystal cell according to the present embodiment has the following advantages. If there are no structures as shown in FIG. 12 included to the LCD, there is no need to position the measurement point and to set the focus. Further, the method according to the present embodiment enables to measure any type of LCD, regardless of the liquid crystal material in the liquid crystal layer or the orientation of the molecules. Further, the method is capable of measuring the thickness or gap of not only liquid crystal displays, but also anything formed of films or layers which are transparent to near-infrared light, and the interference fringe of which may be observed by an FT-NIR analyzer.

Embodiment 4 will now be explained. The object for measurement according to embodiment 4 is a liquid crystal display using PALC (plasma address liquid crystal) elements as liquid crystal driving elements. The result of measurement of the cell gap of the PALC display using the cell gap measurement device of FIG. 10 is explained.

Figure 17:
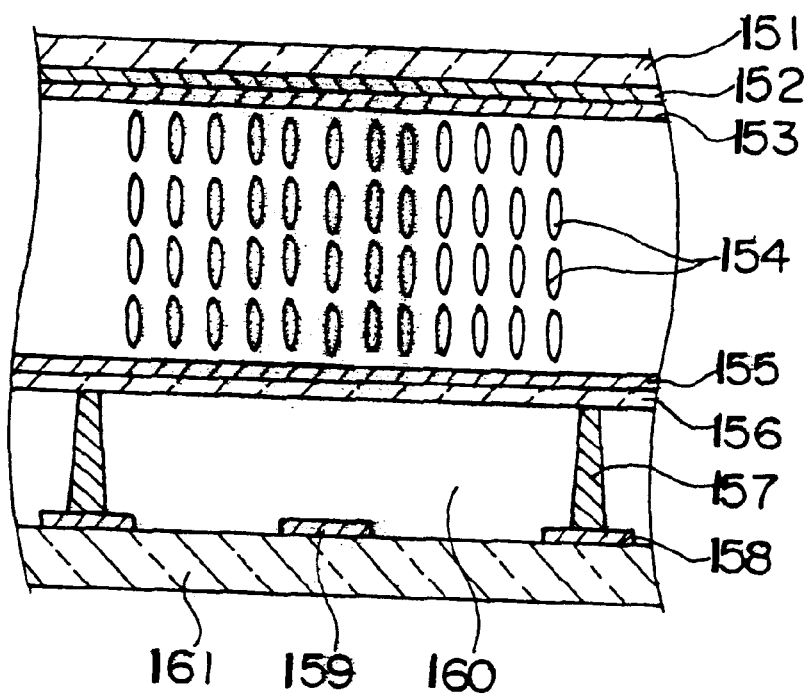
FIG. 17 is a cross-sectional view showing the structure of a liquid crystal display, which is to be measured according to the measurement method of embodiment 4.
Figure 18:
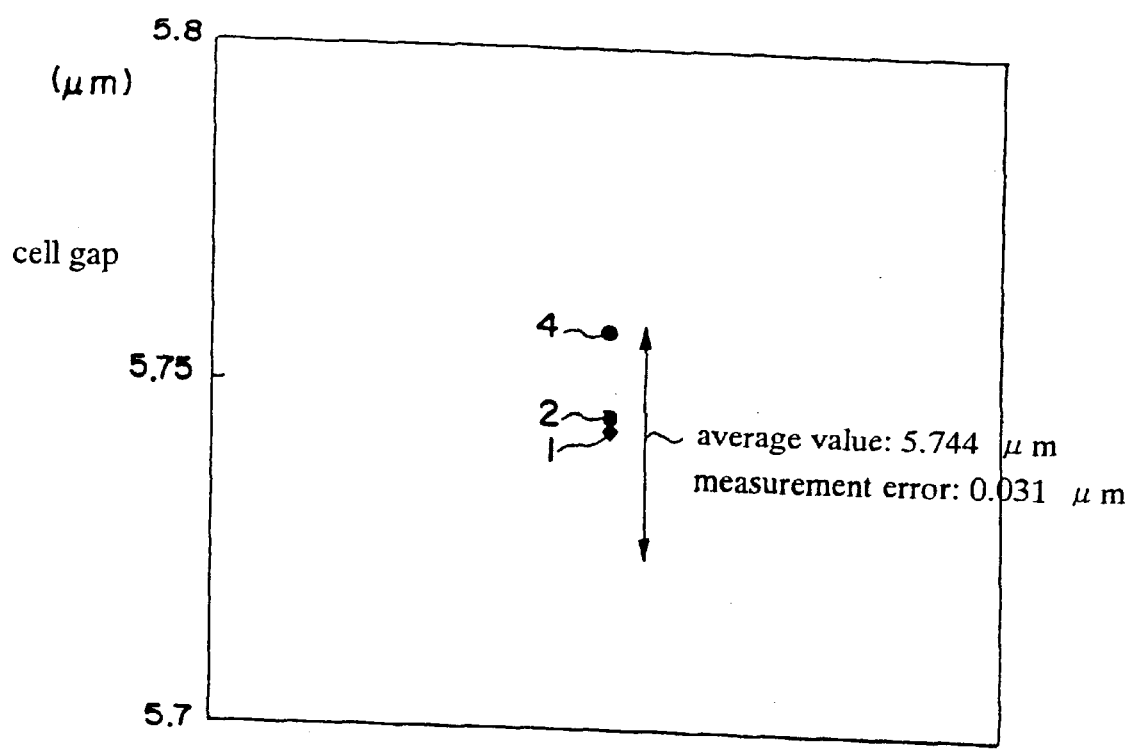
FIG. 18 is an explanatory view showing the result of cell gap measurement according to the measurement method of embodiment 4.

FIG. 17 is a cross-sectional view showing the actual structure of the plasma address liquid crystal display according to embodiment 4. The liquid crystal display includes a CF substrate, made for example of transparent glass 151, mounted on one side of the liquid crystal layer 154 (upper side of the drawing). On the other side of the liquid crystal layer 154 (lower side of the drawing) is a plasma generation substrate, having a thin plate glass 156 as a dielectric sheet and a plasma support substrate 161 being opposed to each other. A plurality of separation walls 157 are arranged in lines between the plasma support substrate 161 and the thin plate glass 156. The space surrounded by the wall 157, the plasma support substrate 161 and the glass 156 constitute channels 160 arranged in lines, and filled with plasma gas. In every channel 160 are an anode electrode 158 and a cathode electrode 159 for forming plasma gas. The PALC substrate is manufactured according to a known art.

On the side of the liquid crystal layer 154 of the CF substrate 151 is mounted a color filter (CF). On the filter are formed transparent electrodes 152 in striped forms, functioning as data lines. The electrodes are arranged to cross the line-shaped plasma channels 173, for example in perpendicular orientation (orthogonal to the channels). The liquid crystal layer 154 is sandwiched between the CF substrate 151 and the thin plate glass 156. The cell gap between the CF substrate 151 and the plate glass 156 (not shown in FIG. 17) is controlled by first and second convex portions (refer to FIGS. 11 and 12), similar to embodiment 3.

Perpendicular orientation layers 153, 155 are each formed to the surface facing the liquid crystal layer 154 of the glass 56 and the CF substrate 151. Further, the CF substrate 151, the ITO electrode 152 and the liquid crystal layer 154 constitute a liquid crystal cell. The LCD formed as above includes perpendicular orientation layers mounted on the surfaces of the thin plate glass 156 and the CF substrate 151 contacting the liquid crystal layer. Therefore, when a liquid crystal material having negative dielectric anisotropy is used to form the liquid crystal layer 154, the liquid crystal molecules will be oriented perpendicularly to the substrate when no voltage is impressed.

Measurement is performed to the LCD formed by the above-mentioned manufacture process. The same point of the LCD is measured under a room temperature atmosphere of 25 degrees, and under the following measurement conditions.

1. A 100 μm×100 μm region of the CF substrate is focused during measurement.
2. The position shown in 1 is re-measured repeatedly.
3. The position shown in 1 is defocused.
4. After moving the stage, the position shown in 1 is measured under the same condition as 1.

Figure 15:
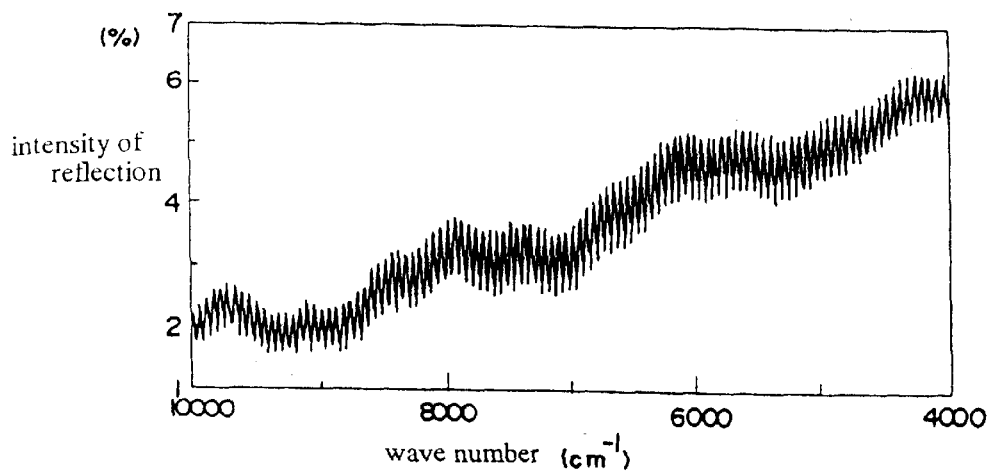
FIG. 15 is a spectrum diagram showing the interference fringe waveform obtained by measuring the liquid crystal display according to the cell gap measurement method of embodiment 4.
Figure 16:
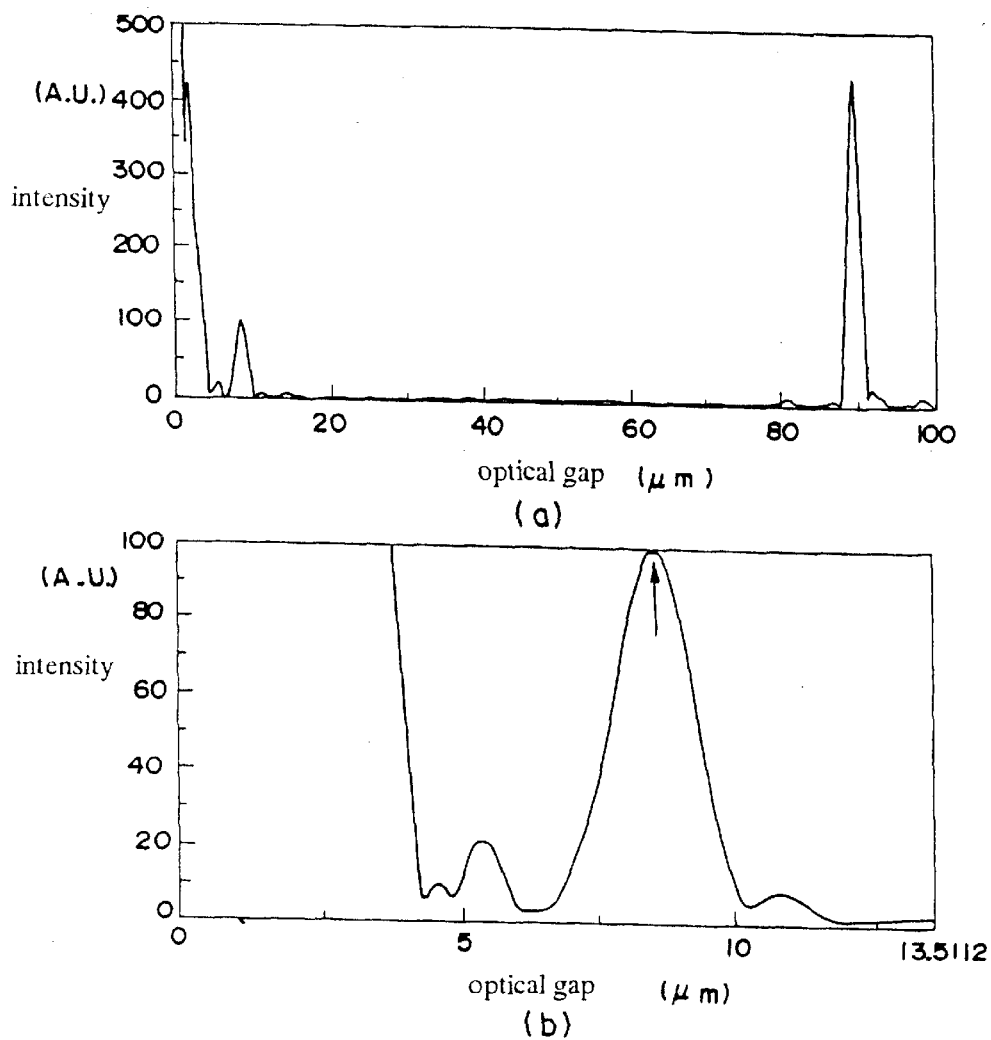
FIG. 16 shows an FFT analysis data showing the relation between the reflection light intensity and the optical gap obtained as a result of cell gap measurement method according to embodiment 4.

Using the measurement device of embodiment 3 (refer to FIG. 10), the above-mentioned liquid crystal display shown in FIG. 17 is measured. The obtained interference fringe waveform is analyzed, in order to obtain a graph showing the relation between the number of waves (cm$^{-1}$) and the reflection intensity as shown in FIG. 15, and a graph showing the relation between the optical gap and the reflection intensity, as shown in FIG. 16. A cell gap of 5.744 μm±0.031 μm is obtained (refer to FIG. 18). A contact-type step height meter is used for measuring the cell gap control unit (sum thickness of the first and second convex portions), and the result was 5.75 μm. Therefore, it is proved that the value obtained by using the cell gap measurement method of embodiment 4 is appropriate. Accordingly, the present measurement method could be applied to measure the cell gap of a PALC-type liquid crystal display.

Moreover, apart from measuring the cell gap of the liquid crystal layer, the present method is also capable of measuring the layer thickness 1 μm of the color filter, the thickness 50 μm of the glass, the gap 200 μm of the plasma discharge channels 160, and so on. In other words, according to the method for measuring cell gap of liquid crystal displays according to the present invention, not only liquid crystal displays, but also the layer thickness or film thickness of members having a micron-order thickness can be measured.

The cell gap of the liquid crystal display according to embodiment 4 was measured using a cell gap measurement device sold in the market using optical interferometry. No appropriate values could be obtained.

EFFECT OF THE INVENTION

According to one embodiment of the present invention, the cell gap of a liquid crystal display may be measured easily and accurately. Further, during optical designing of the liquid crystal panel or during the testing process of the manufactured display, the cell gap could be measured in a very short time and non-destructively. The liquid crystal display, the method and device for measuring the cell gap of the LCD and the retardation plate according to the present invention enable a low-cost in-line measurement of the cell gap.

According to another embodiment of the present invention, the cell gap of a liquid crystal display may be measured easily, non-destructively, in a short time and accurately, without impressing voltage thereto. Further, the present invention enables not only to measure the gap of an empty liquid crystal layer, but also to measure the gap of a liquid crystal layer filled with liquid crystal material. The present invention provides a method and device for measuring the cell gap of any type of liquid crystal displays with any liquid crystal material, such as a nematic liquid crystal having either positive or negative dielectric anisotropy, or a ferroelectric liquid crystal. Further, the molecules in the material may be in any state of orientation, including TN, STN, HAN, OCB, and ASM.

I claim:

1. A method for measuring cell gap of a liquid crystal display equipped with a liquid crystal cell, including a pair of substrates with electrodes, that is adhered together to form a cell gap with a predetermined size, and a liquid crystal layer sandwiched between said pair of substrates with electrodes;

wherein said cell gap is measured by radiating near-infrared light to a liquid crystal cell, reflectively interfering said near-infrared light by said cell gap, and analyzing the obtained interference waveform to compute said cell gap.

2. A device for measuring cell gap of a liquid crystal display comprising:

an X-Y-Z stage to which said liquid crystal display including a liquid crystal cell to be measured is set;

an FT-NIR spectroscope utilizing near-infrared light as light source;

a detector unit for detecting the reflected interference light from said liquid crystal cell; and an analysis computing unit for analyzing the spectrum of the obtained interference fringe and computing said cell gap based on a peak picking method which measures the interval between a peak and a trough of the spectrum, a Fourier transformation method, or a maximum entropy method (MEM).

3. The device for measuring cell gap of a liquid crystal display according to claim 2, wherein said liquid crystal cell to be measured is either a liquid crystal cell having liquid crystal material injected to said cell gap, or a liquid crystal cell having no liquid crystal material injected thereto.

4. The device for measuring cell gap of a liquid crystal display according to claim 2, wherein said liquid crystal cell to be measured includes a color filter, transparent electrodes and a perpendicular orientation film or a horizontal orientation film laminated on one glass substrate, and liquid crystal driver elements, picture element electrodes and an orientation film laminated on another substrate.

5. The device for measuring cell gap of a liquid crystal display according to claim 2, wherein said liquid crystal display equipped with the liquid crystal cell to be measured is either a transmission-type liquid crystal display or a reflection-type liquid crystal display utilizing driver elements such as TFT or PALC.

6. The device for measuring cell gap of a liquid crystal display according to claim 2, wherein said liquid crystal cell to be measured comprises liquid crystal molecules having TN, STN, vertical (VA), or hybrid-aligned nematic (HAN) orientation.

7. A method for measuring cell gap of a liquid crystal display, the display including a cell gap defined between at least a pair of substrates of the display, the method comprising:

measuring said cell gap by radiating near-infrared energy toward a liquid crystal cell, reflectively interfering said near-infrared energy by said cell gap, and analyzing an obtained interference waveform to compute said cell gap.

8. A method of making a liquid crystal display, the method comprising:

sandwiching a liquid crystal layer between at least a pair of substrates so as to define a cell gap; and measuring said cell gap by radiating near-infrared energy toward a liquid crystal cell, reflectively interfering said near-infrared energy by said cell gap, and analyzing an obtained interference waveform to compute said cell gap.

* * * * *